Patented Dec. 29, 1931

1,838,159

UNITED STATES PATENT OFFICE

WINFIELD SCOTT, OF AKRON, OHIO, ASSIGNOR TO THE RUBBER SERVICE LABORATORIES COMPANY, OF AKRON, OHIO, A CORPORATION OF OHIO

VULCANIZATION OF RUBBER

No Drawing.    Application filed November 1, 1926.    Serial No. 145,714.

The present invention relates to a method of manufacturing vulcanized rubber by a process wherein accelerators of characteristic curing powers are employed in the production of such rubber. The invention will be understood from the following description and examples wherein the new class of vulcanization accelerators are fully set forth and described.

Mercapto-benzo-thiazole, having the formula

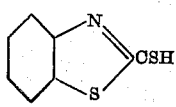

is obtained by heating a mixture of phenyl mustard oil and sulfur. This material has been described as a rubber vulcanization accelerator of some value, but I have found that its commercial usefulness for this purpose can be greatly increased by reacting it with certain other compounds and employing the products so obtained as accelerators.

Mercapto compounds are somewhat acidic in nature, due to the presence of the SH group contained therein, and will therefore form metallic salts such as the lead, zinc, sodium, and potassium salts, and others. I have now further found that certain derivatives of mercapto-benzo-thiazole, and other mercapto compounds may be obtained by reacting the metallic or organic salts of mercapto compounds with a cyanogen halide. This material and other related products are found to be excellent accelerators of the rubber vulcanization process when employed by themselves in a rubber stock or when used in the presence of a complementary accelerator, particularly one of a slightly basic nature, as is hereinafter set forth in detail.

The products referred to may be readily prepared by passing a cyanogen halide, such as cyanogen chloride, through a solution or a suspension of a mercapto compound, preferably a metallic salt or mercaptide. Thus, as an example of the manufacture of such a compound, a salt such as the sodium salt of mercapto-benzo-thiazole, preferably dissolved in a solvent, is reacted with a cyanogen halide, by passing a stream of cyanogen chloride through the solution until the reaction is complete. Combination takes place readily as is indicated by the heating of the mixture and by the production of an insoluble pale yellow colored material. The reaction product is then separated from the liquid by filtration, the residue washed and then dried in any suitable manner.

Instead of employing the salt of the mercapto compound in the manufacture of the material described, mercapto-benzo-thiazole itself may be suspended in a liquid such as alcohol, and then reacted with cyanogen chloride in the manner as described until no material remains undissolved. The alcohol is then removed from the product by evaporation and the residual material is extracted with hot benzol or other solvents, from which the product separates in crystalline form upon cooling.

In a similar manner cyanogen chloride may be reacted with other mercapto compounds, such as the metallic salts of mercapto-ortho and mercapto-para-tolyl-thiazoles, with the sodium and lead salts of thio-phenol, with thiocarbanilid or its metallic salts, with phenyl mustard oil, with di-thio-acids, such as di-thio-benzoic acid, with metallic xanthates such as sodium or potassium ethyl xanthate or broadly with organic compounds containing the CS grouping, wherein the sulfur so present is linked to an H or a SH group or the salts thereof, and where, if a second sulfur atom is present, it is joined to the carbon of the C—SH grouping by a single bond only.

The value of the reaction products of the type hereinbefore set forth, as accelerators of the vulcanization of rubber have been shown by incorporating 0.5 parts of the accelerator into a mix prepared in the well known manner and comprising 100 parts of rubber, such as pale crepe rubber, 5 parts of zinc oxide and 3.5 parts of sulfur. The rubber compound was found to be completely vulcanized to produce a product of commercial qualities after heating for approximately forty-five minutes in a press under the temperature of forty pounds of steam pressure per square inch. While the fully cured rubber stock prepared by employing the cyanogen chloride derivative of a mercapto compound as an accelerator, is found to possess physical characteristics comparable with and superior to many commercial accelerators, it is found that these derivatives as set forth herein, may be readily used without causing any scorching or prevulcanization of the rubber product. That is in the ordinary processing of rubber stocks in the factory, rubber goods containing the reaction products described herein do not show a tendency to partially vulcanize during handling as do stocks containing mercapto-benzo-thiazole and other so-called high power accelerators. This property makes the class of accelerators herein described particularly useful in the manufacture of those types of rubber goods that are subjected to extensive processing during their fabrication.

Another example of the use of the accelerators herein set forth is the following which is illustrative of a tire tread compound. Such a compound comprises 34 parts of smoked sheet rubber, 20 parts of pale crepe rubber, 22 parts of carbon black, 17.75 parts of zinc oxide, 3.0 parts of mineral rubber, 1.75 parts of sulfur, 1.0 parts of a softener, such as a mineral and vegetable oil, and 1.25 parts of one of my preferred type of accelerator, such as the cyanogen chloride reaction product of sodium mercapto-benzo-thiazole. The mix is prepared in the ordinary well known manner and is then vulcanized by heating in a press under steam pressure. A vulcanized commercial product results after heating in this manner for from one to two hours at the temperature given by twenty pounds of steam per square inch or for from thirty minutes to about one hour at the temperature given by thirty pounds of steam pressure per square inch. A product having a somewhat higher tensile strength may be obtained by employing a mixture of 0.4 parts of a basic complementary accelerator such as di-phenyl-guanidine with 0.4 parts of the cyanogen chloride reaction product of sodium mercapto-benzo-thiazole in place of the accelerator mentioned in the example given above and vulcanizing in the manner as described.

A tire cushion stock may be prepared by vulcanizing for approximately one hour at the temperature given by twenty pounds of steam pressure per square inch (or for a slightly longer time at a steam pressure of ten pounds), a rubber compound comprising 100 parts of rubber, such as pale crepe rubber, 25 parts of zinc oxide, 3 parts of sulfur and 1 part of the cyanogen chloride reaction product of sodium mercapto-benzo-thiazole.

A further example of the use of the accelerators set forth herein is in the manufacture of a hard rubber product. Such a rubber may be obtained by vulcanizing for from two hours to two hours and fifteen minutes, a mixture of 100 parts of rubber, such as pale crepe rubber, 45 parts of sulfur, 10 parts of zinc oxide, 5 parts of lime and 2 parts of the cyanogen chloride reaction product of sodium mercapto-benzo-thiazole or in place thereof a mixture of 0.75 parts of a complementary accelerator such as diphenyl-guanidine with 0.75 parts of the cyanogen chloride reaction product of sodium mercapto-benzo-thiazole.

My invention is to be understood as not dependent upon the accuracy of any statements made in explanation of the manufacture or use as accelerators of the compounds set forth herein. Nor is it limited solely to examples as described but the invention is to be considered to be that defined by the claims attached hereto as a part of this specification wherein I intend to claim as accelerators of the rubber vulcanization process, those compounds obtained by the reaction of a cyanogen halide upon the metallic salts of mercapto-benzo-thiazole and related compounds containing a CS group.

I claim:

1. The process of treating rubber which comprises combining said rubber with a vulcanizing agent and a small proportion of an undecomposed reaction product of cyanogen chloride and sodium mercapto-benzo-thiazole admixed with a complementary organic accelerator of basic nature.

2. The process of treating rubber which comprises combining said rubber with a vulcanizing agent and a small proportion of an undecomposed reaction product of cyanogen chloride and sodium mercapto-benzo-thiazole admixed with diphenyl-quanidine.

3. A vulcanized rubber product obtained by heating rubber and sulfur in the presence of a small proportion of an undecomposed reaction product of cyanogen chloride and sodium mercapto-benzo thiazole admixed with a complementary organic accelerator of basic nature.

4. A vulcanized rubber product obtained by heating rubber and sulfur in the presence of a small proportion of an undecomposed reaction product of cyanogen chloride and sodium mercapto-benzo-thiazole admixed with diphenyl-guanidine.

5. A rubber vulcanization accelerator comprising a mixture of an organic accelerator of basic nature with the reaction product of cyanogen chloride and sodium mercapto-benzo-thiazole.

6. A rubber vulcanization accelerator comprising a mixture of substantially equal weights of a di-substituted guanidine accelerator and the reaction product of cyanogen chloride with sodium mercapto-benzo-thiazole.

7. A rubber vulcanization accelerator comprising a mixture of substantially equal weights of diphenyl-guanidine and the reaction product of cyanogen chloride with sodium mercapto-benzo-thiazole.

8. The process of treating rubber which comprises combining said rubber with a vulcanizing agent and a small proportion of an undecomposed reaction product of cyanogen chloride and sodium mercapto-benzo-thiazole activated with diphenyl-guanidine and forming therewith a mixed accelerator.

9. A vulcanized rubber product obtained by heating rubber and sulfur in the presence of an undecomposed reaction product of cyanogen chloride and sodium mercapto-benzo-thiazole activated with diphenylguanidine and forming therewith a mixed accelerator.

In testimony whereof I affix my signature.

WINFIELD SCOTT.